(12) United States Patent
Caminiti et al.

(10) Patent No.: US 8,903,640 B2
(45) Date of Patent: Dec. 2, 2014

(54) COMMUNICATION BASED VEHICLE-PEDESTRIAN COLLISION WARNING SYSTEM

(71) Applicants: Lorenzo Caminiti, Ann Arbor, MI (US); Jeffrey Clark Lovell, Midland, MI (US); James Joseph Richardson, Temecula, CA (US); Christopher Thomas Higgins, Placentia, CA (US)

(72) Inventors: Lorenzo Caminiti, Ann Arbor, MI (US); Jeffrey Clark Lovell, Midland, MI (US); James Joseph Richardson, Temecula, CA (US); Christopher Thomas Higgins, Placentia, CA (US)

(73) Assignees: Toyota Motor Engineering & Manufacturing North America, Inc., Erlanger, KY (US); Raytheon Company, Waltham, MA (US)

( * ) Notice: Subject to any disclaimer, the term of this patent is extended or adjusted under 35 U.S.C. 154(b) by 0 days.

(21) Appl. No.: 13/894,764

(22) Filed: May 15, 2013

(65) Prior Publication Data
US 2013/0253816 A1 Sep. 26, 2013

Related U.S. Application Data

(62) Division of application No. 12/403,067, filed on Mar. 12, 2009, now abandoned.

(60) Provisional application No. 61/107,516, filed on Oct. 22, 2008.

(51) Int. Cl.
| | |
|---|---|
| *G06F 17/10* | (2006.01) |
| *G08G 1/16* | (2006.01) |
| *G08G 1/04* | (2006.01) |
| *G01S 19/00* | (2010.01) |
| *B60R 21/34* | (2011.01) |
| *G08G 1/01* | (2006.01) |

(52) U.S. Cl.
CPC ............. *G01S 19/00* (2013.01); *G08G 1/164* (2013.01); *G08G 1/04* (2013.01); *B60R 21/34* (2013.01); *G08G 1/0104* (2013.01)
USPC ........... 701/301; 340/436; 340/901; 340/907; 340/438

(58) Field of Classification Search
USPC .................. 701/301; 340/436, 438, 901, 907; 348/148, 149
See application file for complete search history.

(56) References Cited

U.S. PATENT DOCUMENTS

| | | | |
|---|---|---|---|
| 5,926,114 A | 7/1999 | Andrews | |
| 6,243,644 B1 * | 6/2001 | Dengler | 701/117 |

(Continued)

*Primary Examiner* — Ernesto Suarez
(74) *Attorney, Agent, or Firm* — Gifford, Krass, Sprinkle, Anderson & Citkowski, P.C.

(57) ABSTRACT

A system for detecting a pedestrian is provided. The system includes a base and a mast extending from the base, and a plurality of sensors mounted on the mast, the plurality of sensors for detecting objects and pedestrians within a predetermined range, and wherein the sensors include a GPS antenna, at least one camera, an alert mechanism, a radio with an integrated directional antenna, and a short range communication antenna. A path predicting circuit is in communication with a system vehicle and the pedestrian detection system. The path predicting circuit processes information from the system vehicle and pedestrian detection system to predict the path of the system vehicle and detected objects. The path predicting circuit is in communication with a path collision circuit and the predicted paths are mapped on the path collision circuit so as to determine if the system vehicle may possibly collide with a detected object.

9 Claims, 7 Drawing Sheets

(56) References Cited

U.S. PATENT DOCUMENTS

| | | |
|---|---|---|
| 6,307,484 B1 | 10/2001 | Sasaki et al. |
| 6,337,637 B1 | 1/2002 | Kubota et al. |
| 6,472,978 B1 | 10/2002 | Takagi et al. |
| 6,624,782 B2 | 9/2003 | Jocoy et al. |
| 6,985,696 B2 | 1/2006 | Bromham et al. |
| 7,019,669 B1 * | 3/2006 | Carr ............................... 340/906 |
| 7,036,621 B2 | 5/2006 | Takafuji et al. |
| 7,363,155 B2 | 4/2008 | Meister et al. |
| 7,380,633 B2 | 6/2008 | Shen et al. |
| 7,639,159 B2 | 12/2009 | McNew et al. |
| 7,663,505 B2 * | 2/2010 | Publicover .................... 340/932 |
| 7,739,006 B2 * | 6/2010 | Gillula ............................ 701/24 |
| 7,899,616 B2 | 3/2011 | Breed |
| 8,000,897 B2 | 8/2011 | Breed et al. |
| 8,081,087 B2 * | 12/2011 | Jones ............................ 340/907 |
| 8,538,675 B2 * | 9/2013 | Richardson ................... 701/301 |
| 2003/0191577 A1 * | 10/2003 | Decaux ......................... 701/117 |
| 2005/0107954 A1 | 5/2005 | Nahla |
| 2006/0190175 A1 | 8/2006 | Moriizumi et al. |
| 2006/0274149 A1 | 12/2006 | Yoshizawa |
| 2008/0065328 A1 | 3/2008 | Eidehall et al. |
| 2008/0077296 A1 | 3/2008 | Kawasaki |
| 2008/0133136 A1 | 6/2008 | Breed et al. |
| 2008/0167821 A1 | 7/2008 | Breed |
| 2008/0288162 A1 | 11/2008 | Theimer et al. |

* cited by examiner

Step 1

> Establish a Roadside Infrastructure Including a Plurality of Roadside Sensors Selectively Distributed Throughout the Infrastructure, Wherein Each of the Plurality of Roadside Sensors Detects the Velocity and Location of the Detected Objects Step 2

> Predict the Path of Each Detected Object Based Upon Velocity, Location of the Detected Objects Step 3

> Establish a System Vehicle Equipped with Sensors so as to Detect the Velocity and Location of the System Vehicle.

Step 4

> Predict the Path of the System Vehicle Based Upon Velocity and Location of the System Vehicle.

Step 5

> Process the Predicted Path of the System Vehicle and the Predicted Path of the Detected Objects to Predict a Collision Between Any of the Detected Objects and the System Vehicle.

*Fig-6*

COMMUNICATION BASED VEHICLE-PEDESTRIAN COLLISION WARNING SYSTEM

CROSS-REFERENCE TO RELATED APPLICATIONS

This application is a divisional application of U.S. patent application Ser. No. 12/403,067 filed on Mar. 12, 2009, which claims priority of U.S. Provisional Patent Application Ser. No. 61/107,516 filed Oct. 22, 2008, which are incorporated herein by reference.

FIELD OF THE INVENTION

The present invention relates to a collision warning system. More particularly, the invention relates to a collision warning system utilizing a path predicting circuit which gathers information from a system vehicle and roadside infrastructure to predict the path of the system vehicle and objects and a path collision circuit which determines if there is a potential for collision between the two.

BACKGROUND OF THE INVENTION

Vehicle warning systems are known and used to help drivers identify potential collisions. Specifically, U.S. Pat. No. 6,472,978 to Takagi et al. discloses a system including a communication unit held by a pedestrian and a transmitter/receiver equipped on a vehicle. The communication unit and the transmitter/receiver are in communication with each other when the pedestrian is within a predetermined proximity to the vehicle. A notification can be provided to both the vehicle and the pedestrian that they are within close proximity to each other so as to help the vehicle and pedestrian avoid colliding with each other. The system may also include a roadside transmitter which receives and transmits information to the vehicle driver.

U.S. Patent Application Publication No. 2005/0107954 to Nahla discloses a collision warning avoidance system using an onboard navigation unit and a GPS interface to locate a train. At least one fixed transponder station is distributed along the train track. The trains are provided with transponders which allow a management system to track the location and movement of the transponders and notify trains when the path of another transponder indicates that there is a potential for a collision.

U.S. Pat. No. 5,983,161 to Lemelson et al. discloses a vehicle collision avoidance and warning system using GPS. Lemelson teaches using a GPS to predict a path of a vehicle and using GPS to monitor the paths of other vehicles and determine if any of the paths intersect so as to notify appropriate vehicles of a potential collision.

However, neither Takagi nor Lemelson provide responsive and timely information to vehicles. Specifically, Lemelson et al. teaches a system which requires tremendous processing capabilities to process all the different GPS information and paths of different vehicles. Further processing time is required so as to eliminate vehicles which are not within a sphere of influence of each other. Takagi et al. does not detect whether or not the person and the vehicle are heading in the same direction. Rather, Takagi just notifies a vehicle and a person of the close proximity to each other. Furthermore, Nahla is not scalable and is not adaptable to existing roadways because Nahla teaches path prediction based upon the speed and direction of a particular train along an established railway. Accordingly, it is desirable to have a system that can predict whether or not, based upon the path of two objects, there is a potential for a collision and can do so in a timely manner without all of the equipment and processing capabilities disclosed in Lemelson. It is further desirable to have a scalable and adaptable vehicle collision warning system that may be selectively implemented on roadways having a history of traffic accidents.

SUMMARY OF THE INVENTION

According to one aspect of the invention, a system and method is provided for predicting a vehicle collision with an obstacle. The system includes a system vehicle equipped with onboard equipment directed towards gathering vehicle information necessary to predict the path of the vehicle, a roadside infrastructure having a plurality of roadside sensors selectively distributed throughout the infrastructure so as to detect objects and predict the path of the detected objects. A path predicting circuit is in communication with the system vehicle and the roadside infrastructure. The path predicting circuit processes information from the system vehicle and roadside infrastructure to predict the path of the system vehicle and detected objects. The path predicting circuit is in communication with a path collision circuit. The path collision circuit processes the predicted paths so as to determine if the system vehicle may possibly collide with a detected object.

DETAILED DESCRIPTION OF THE INVENTION

Referring to the figures wherein like numerals indicate corresponding parts throughout the several views, a system 10 and method 12 for predicting vehicle collision is provided.

Figure 1:
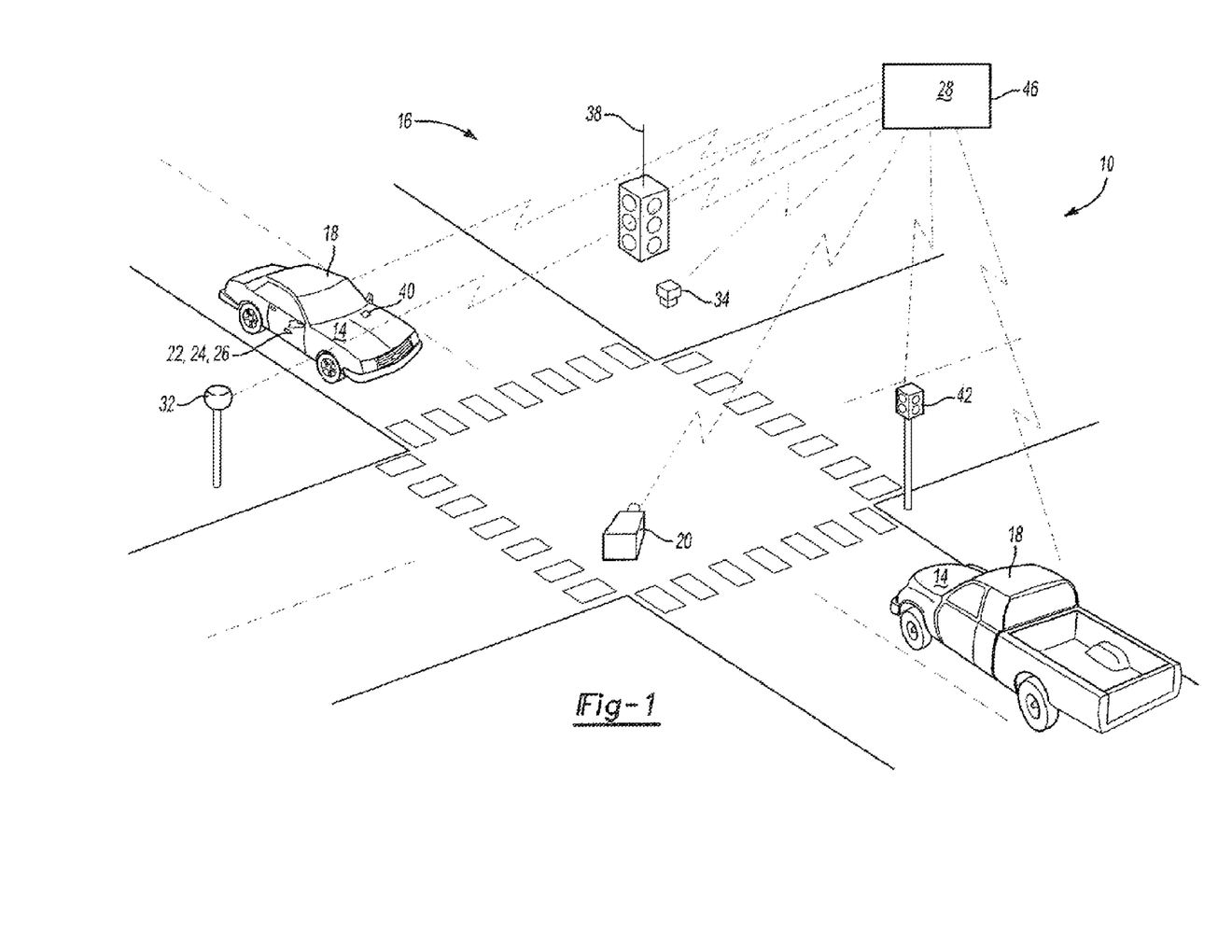
FIG. 1 is an illustration of the system showing the system vehicle and roadside infrastructure in communication with a remote server, the remote server houses the path predicting circuit and the path collision circuit and receives data so as to perform path prediction.

With reference to FIG. 1, the system 10 includes onboard equipment 14 and roadside equipment 16, both directed towards gathering information required to predict the path of a detected object and a vehicle.

Specifically, the system 10 includes a system vehicle 18 equipped with onboard equipment 14. The onboard equipment 14 detects information which can be used to predict the path of a vehicle. For example the system vehicle 18 may be equipped with a camera 20 or a global positioning system. The system vehicle 18 may also be equipped with a velocity sensor 22 and/or acceleration sensor 24, a wheel sensor 26 to measure the angular orientation of the vehicle wheels. Such sensors and equipment are currently known and used in the art. It is anticipated that the system 10 may also transmit information such as braking, turning signal status, or which drive the system vehicle 18 is engaged in. Information collected from the onboard equipment 14 is transmitted to a path predicting circuit 28, where the information is processed and a prediction of the path of the system vehicle 18 is generated. The path predicting circuit 28 may be located within the system vehicle 18, a roadside infrastructure 30 or a remote server 46.

The roadside infrastructure 30 further includes roadside equipment 16 that is directed towards detecting objects within a predetermined range. The roadside equipment 16 gathers object information such as the velocity and location of detected objects. This information is then processed so as to predict the path of each object detected within the roadside infrastructure 30. For instance, cameras 20 may be used and positioned throughout the roadside infrastructure 30 so as to detect an object using pixel image decoding or other known object detecting technology.

The cameras 20 may also work in concert with a sensor such as radar 32 or sonar 34 so as to associate each detected object with its speed and direction. A fusion circuit 33 is provided. The fusion circuit 33 processes the information from the sensor, and camera 20 so as to associate the detected objects with its speed and direction using known camera-radar fusing technology as disclosed in "Object Learning by Radar-Vision Fusion in Driver Assistance Systems," by Prokhorov et al., and incorporated herein by reference.

The speed and direction of the detected objects may be mapped onto the camera 20 image and processed so as to help predict the path of the detected object. Alternatively, the fused data may be transmitted to the path predicting circuit 28 which is in communication with the roadside infrastructure 30. The path predicting circuit 28 predicts the path of the system vehicle 18 and the path of the detected objects using the information gathered by the roadside infrastructure 30.

Figure 2:
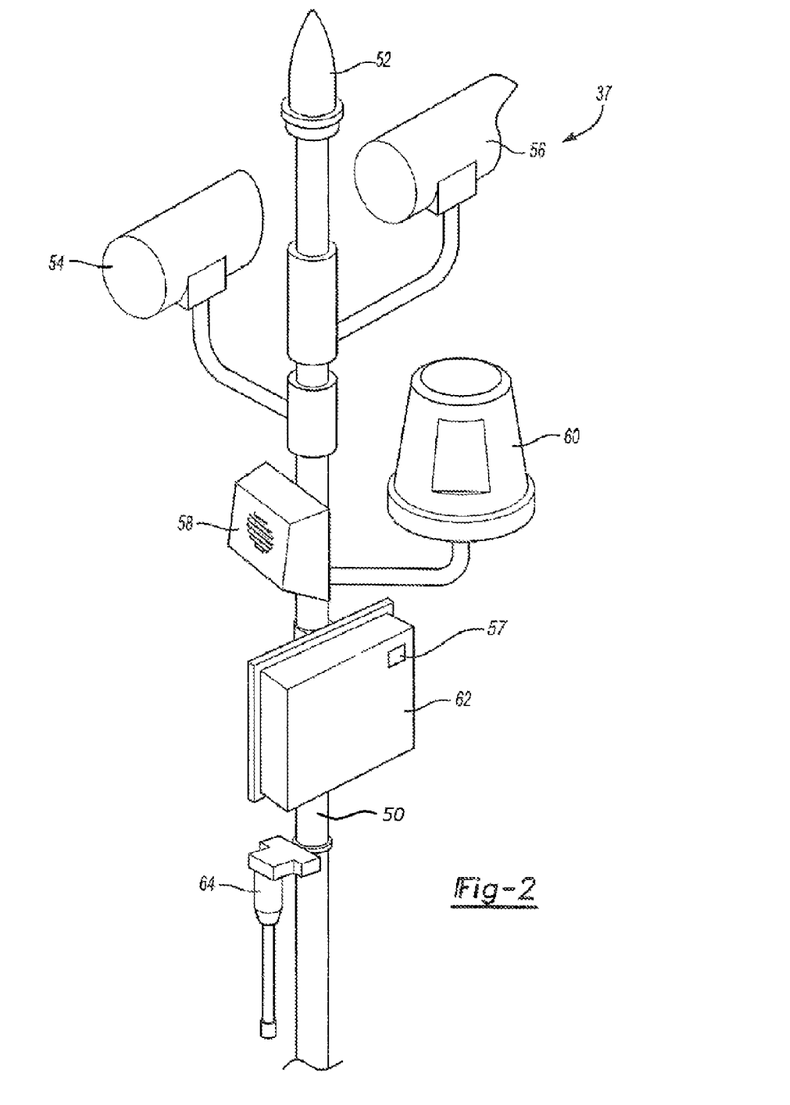
FIG. 2 is an illustration of a pedestrian detection system.
Figure 2A:
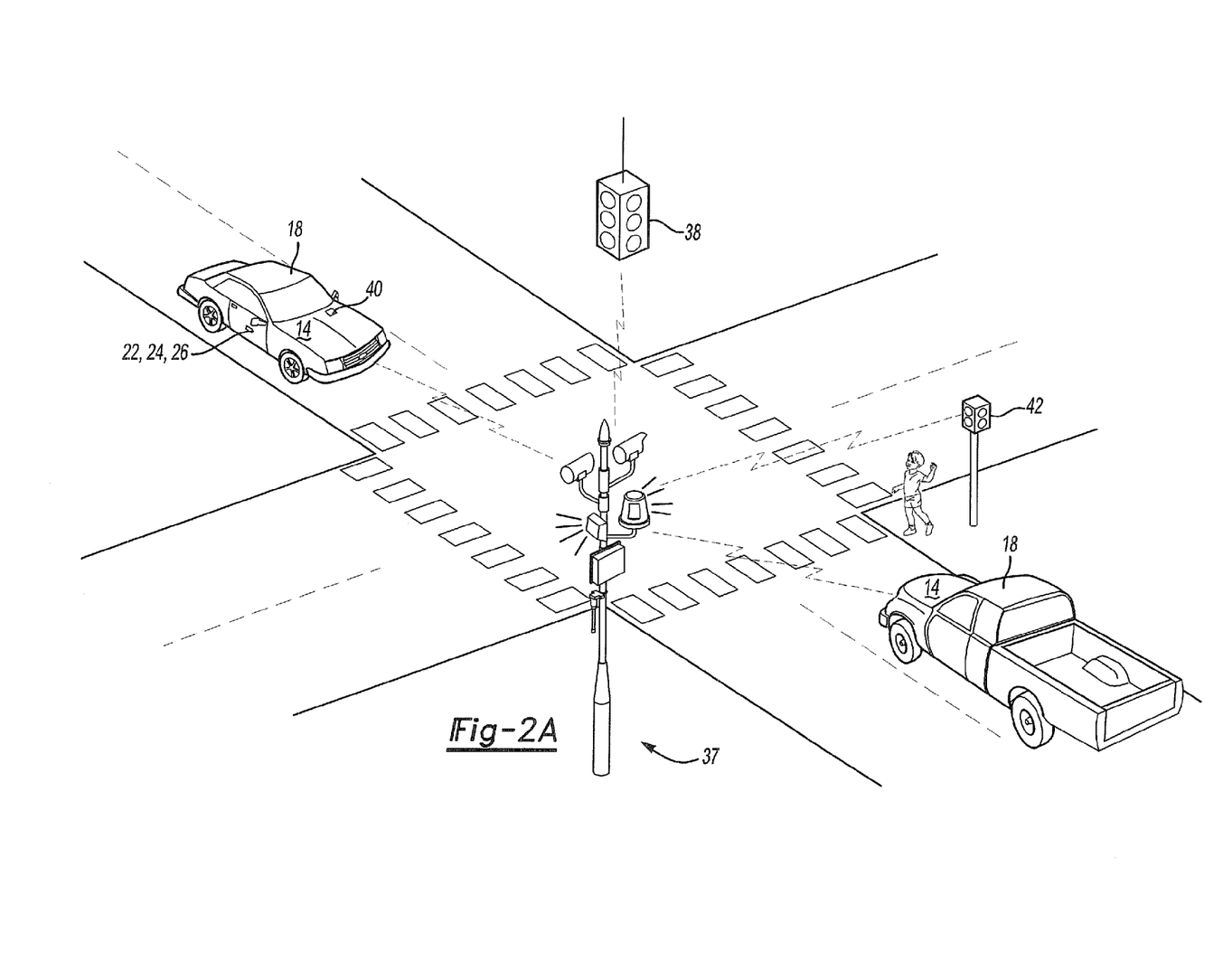
FIG. 2a is an illustration of the system wherein the pedestrian detection system is disposed at an intersection.

With reference now to FIG. 2, a preferred embodiment of the roadside infrastructure 30 is provided. As shown, the sensors are consolidated onto pedestrian detection system 37. The pedestrian detection system 37 includes a mast 50, and mounted on the mast 50 are sensors such as a GPS antenna 52, a thermal camera 54, a high-resolution camera 56, a camera video analytic processor 57, a programmable audio siren 58, a pedestrian warning light 60, a radio with an integrated directional antenna 62, and a Dedicated Short Range Communication ("DSRC") antenna 64.

It is anticipated that the sensors of the pedestrian detection system 37 are modular and thus may be exchanged depending on the desired range. As illustrated by FIG. 1, the sensors of the pedestrian detection system 37 may be mounted separately from each other, either on a standalone base, or nearby structures such as buildings and lamp posts.

Thus, the pedestrian detection system 37 provides a range of coverage determined by factors such as camera view and radar range. It should also be apparent that the pedestrian detection system 37 is scalable, meaning that the coverage provided may be modified to accommodate a particular intersection or roadway. This may be done by simply changing the sensors such as the camera 20 or radar 32. It is also anticipated that the roadside infrastructure 30 may include a plurality of pedestrian detection systems 37 selectively distributed throughout the roadside infrastructure 30.

Because the pedestrian detection subsystem incorporates a camera 20 and radar 32, collision prediction is not just limited to the road, but may also include instances where the vehicle is predicted to drive off the road, so long as that area is within the coverage of the pedestrian detection system 37. Further, the pedestrian detection system 37 protects pedestrians by notifying pedestrians within its predetermined range of a possible collision and unlike prior art does not require the pedestrian to be equipped with a device in order to receive the warning.

The cameras 20 provide the pedestrian detection system 37 with a wide view those other sensors such as radar 32 and sonar 34 lack. The images captured by the cameras 20 may be processed along with the GPS information so as to map the location of people within the camera 20 view. Specifically, the camera video analytic processor 57 processes imagery from the high resolution camera 56 and thermal image from the thermal imaging camera 54 so as to synchronize and fuse high-dynamic range color camera imagery with thermal imagery from the thermal imaging camera 54 for optimal target/pedestrian detection under all lighting and weather conditions. The video analytics includes embedded model-based tracking algorithms to ensure tracks are not dropped due to momentary line-of-sight obstruction. These camera systems are available current art in the security camera system field.

The pedestrian detection system 37 gathers information from its nested sensors 22, 24, 26 and cameras 20, and processes the information so as to be independent of the system vehicle 18. Specifically, objects and pedestrians are identified by the pedestrian detection system 37 using the camera 20. The information is processed so as to predict the path of the pedestrian or object. The predicted path may be transmitted to the system vehicle 18 using the DSRC 64 so as to warn the driver of a possible collision. Possible collision information transmitted by the system vehicle 18 may be processed by the pedestrian detection system 37 so as to warn the pedestrian of a possible collision.

Figure 4:
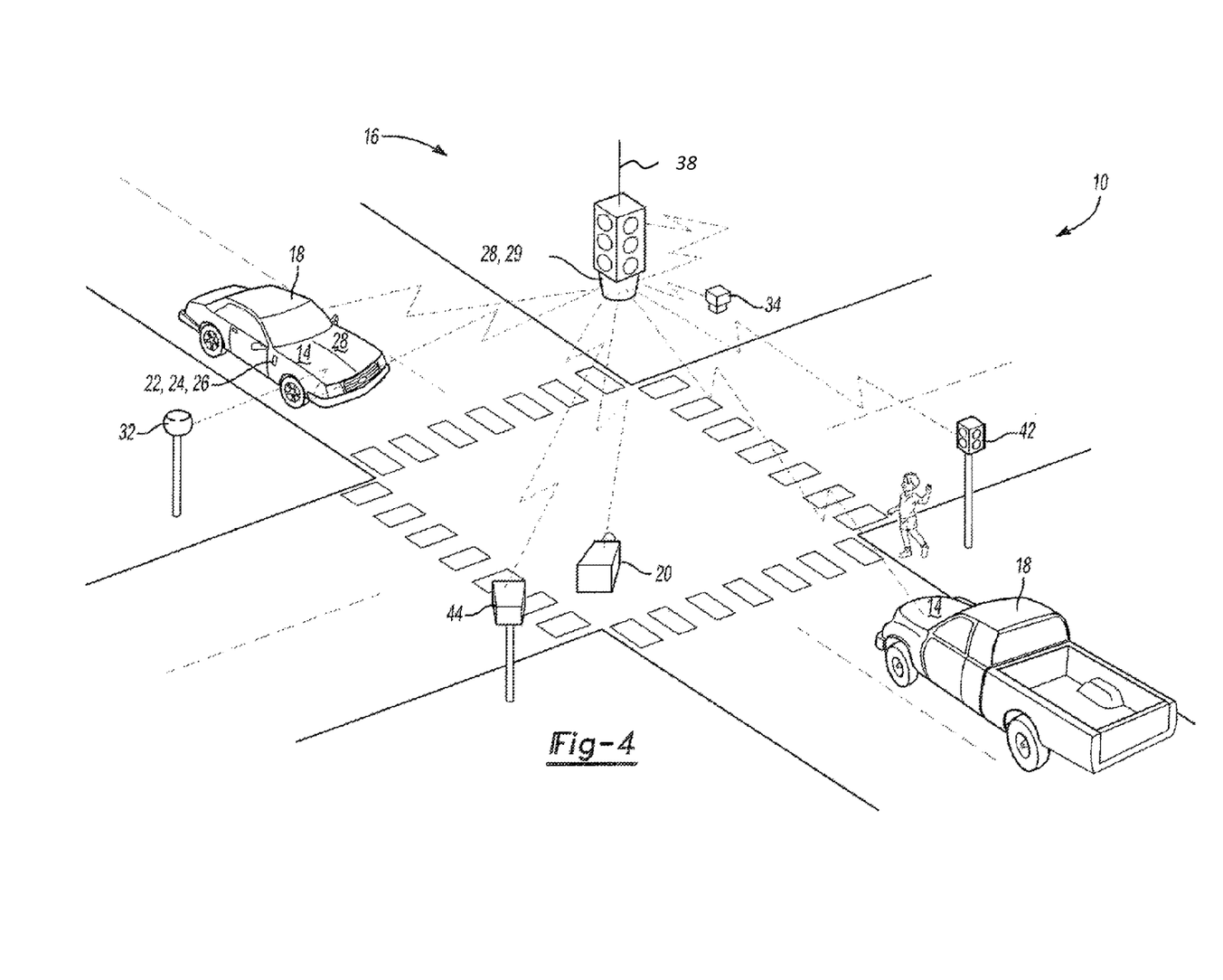
FIG. 4 is an illustration of the operation of the system showing the system vehicle and roadside infrastructure communicating directly with each other, both roadside infrastructure and system vehicle are equipped with the path predicting circuit and path collision circuit, and collision prediction and warning are done onsite.

With reference now to FIG. 4, a second preferred embodiment is provided. In the second preferred embodiment, the system vehicle 18 and roadside infrastructure 30 are equipped to generate path prediction and collision warning onsite. Specifically, both the system vehicle 18 and roadside infrastructure 30 are equipped with a path predicting circuit 28 and a path collision circuit 29 both of which may be implemented in software. In operation, the sensors 22, 24, 26 onboard the system vehicle 18 gathers information such as wheel orientation, speed, location, acceleration, and the like. This information is processed by the path predicting circuit 28 so as to generate a path prediction, the path prediction is then transmitted to the path collision circuit 29 onboard the system vehicle 18. Likewise, the roadside infrastructure 30 gathers information regarding detected objects, such as the location, speed and direction of a detected object. The information is transmitted to the path predicting circuit 28 onboard the roadside infrastructure 30, and processed so as to generate a path prediction for each detected object. The roadside infrastructure 30 is in communication with the system vehicle 18, and transmits to each other their respective path predictions. The path predictions are processed by the onsite path collision circuit 29. In one embodiment, the path collision circuit 29 executes a warning algorithm 36 which plots the predicted paths onto a map to determine if there is a possibility of a collision.

Figure 3A:
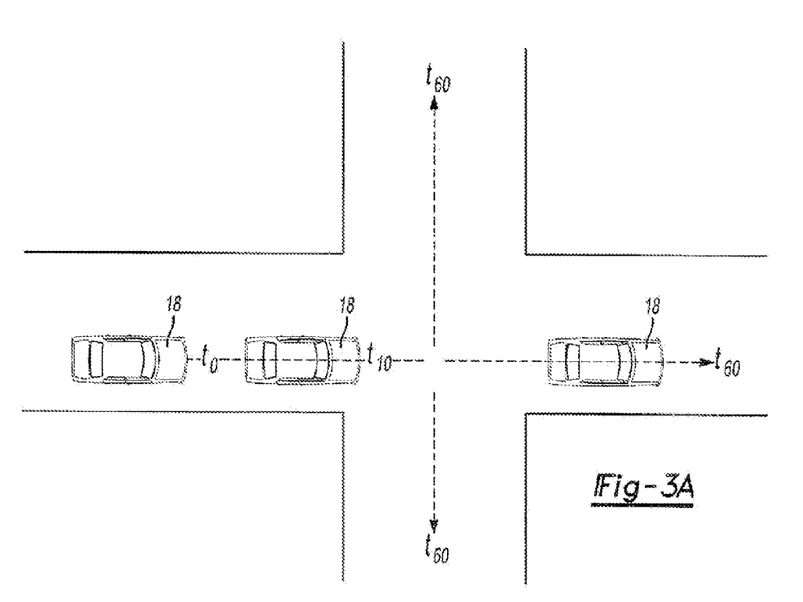
FIG. 3a is an illustration of a scenario where path prediction is limited by time, specifically, the path collision circuit is not concerned with where the car would be after a predetermined amount of time.

It should be appreciated that the predicted path of the system vehicle 18 may be limited by time or distance, and may also take into consideration other factors such as the orientation of the roadway, or a cross-walk. With reference now to FIG. 3*a*, the path prediction of a system vehicle 18 is limited to ten seconds after the location of the system vehicle 18 has been established. Thus the path predicting circuit 28 may provide a more meaningful predicted path as the predicted path does not attempt to indicate where the system vehicle 18 would be one minute from the time the prediction is made. Rather the path prediction is limited by a predetermined time. The predetermined time may vary depending upon the speed and the configuration of the road as well as the location of the vehicle. For instance if the roadside infrastructure 30 is established on a four-way intersection as shown in FIG. 3*a* and the vehicle path prediction is taken at $T_0$, for a system vehicle 18 moving at 25 miles per hour the path prediction circuit may provide a path prediction that extends 5 seconds after $T_0$, whereby predicting that the system vehicle 18 would be entering into the intersection.

However, in the situation described above, the path predicting circuit 28 will not predict where the vehicle will be one minute from the time $T_0$ as such a prediction is likely to be inaccurate because the vehicle may make a left turn at the intersection, a right turn at the intersection or head straight past the intersection, thus making a prediction for one minute past $T_0$ to be extremely uncertain. Conversely, if the vehicle information is gathered on a straightaway road such as a highway and the vehicle is seen traveling at 60 miles per hour and there is no curvature or exits for a mile, the prediction of the path at one minute after $T_0$ may be meaningful and relevant to the driver of the system vehicle 18.

Figure 3B:
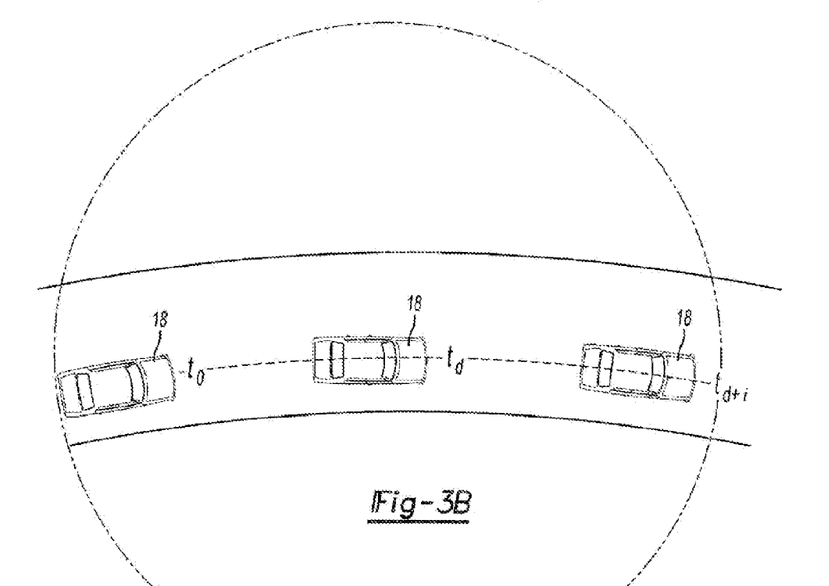
FIG. 3b is an illustration of a scenario where path prediction is limited by the range of the roadside infrastructure, the path collision circuit will not make collision predictions for predicted paths extending beyond the range of the roadside infrastructure.

Alternatively, path prediction may also be limited by the object detection range of the roadside infrastructure 30 such that predicted paths falling outside of the predetermined range of the roadside infrastructure 30 are not considered. With reference now to FIG. 3*b*, the predicted path of a vehicle is limited to the object detection range of the roadside infrastructure 30 as shown by the area enclosed by the generally circular dashed line. The location of the vehicle is established at $t_0$ and the predicted path of the vehicle from $t_0$ to $t_d$ (where d denotes the range of the roadside infrastructure) is used by the path collision circuit 29, whereas the predicted path of the vehicle at $t_{d+i}$ (where i denotes any distance beyond the range of the roadside infrastructure) is not considered in predicting a collision.

The path predicting circuit 28 uses various information to predict a path. For instance, path prediction may be developed by ascertaining the location and velocity of a detected object or system vehicle 18. The path predicting circuit 28 may use more sophisticated processes, such as mathematical models for vehicle dynamics, or statistical models for pedestrian motion. Such models use the current information such as object location and velocity as an initial condition, and can be computed to assert the state of the object at a time in the future. Other information may be used and implemented in mathematical models. For instance, the wheel sensor 26 measures the angular orientation of the vehicle's wheel so as to provide the mathematical model with an initial wheel condition which may then be used to predict the path of the vehicle. The mathematical model may also take into consideration the path of the road, traffic light 38 conditions, and the like.

A lot of factors may be used to predict a path and the sensors and information used herein are not limiting. The path predicting circuit 28 may generate path prediction based upon statistical data gathered about pedestrians at a particular intersection. Specifically, observations of pedestrian behavior may be collected to determine the probability of pedestrian movement. For instance, the statistical data may include the probability of a pedestrian crossing an intersection having a cross walk signal, for each cross walk signal condition. For example, the probability of pedestrians crossing the intersection when the cross walk signal indicates "walk" may be 90%, and the probability of pedestrians crossing the intersection when the cross walk signal indicates "stop" may be 30%. Such statistical data may be used by the path predicting circuit 28 to determine the path of the pedestrian.

As stated above, the path collision circuit 29 processes predicted paths to determine if any of the predicted paths intersect with each other at the same time. If any of the predicted paths of the detected objects intersect with the predicted vehicle path then the path collision circuit 29 will communicate to a driver interface 40 disposed in the system vehicle 18 and the system vehicle 18 can then warn the driver that a collision is predicted. The driver interface 40 may provide a visual or audible warning, such as a display screen or speaker, or a combination thereof. The system 10 may provide other information relating to detected objects, such as whether the object is a pedestrian or an animal, whether it is moving or stationary. For example, the system 10 may communicate to the system vehicle 18 that there is a stationary object in the middle of the road. The path collision circuit 29 may also eliminate irrelevant information thereby reducing the size of information transmitted to the vehicle. Limiting information to the system vehicle 18 will reduce the system vehicle's 18 processing time, and prevent the system vehicle 18 from being burdened with too much information. For instance, the path collision circuit 29 may not transmit information about a detected object to a system vehicle 18 where the detected object poses no present or future threat to the vehicle.

The system 10 may further include a wireless communication system 11 to transmit information between the roadside infrastructure 30 and the system vehicle 18, as shown in FIG. 2. Such a wireless system may be a Dedicated Short Range Communication (DSRC) system 64 which enables the road side infrastructure to communicate directly with the system vehicle 18, or to enable one system vehicle 18 to communicate to another system vehicle 18. The vehicle-to-vehicle, or roadside infrastructure-to-vehicle communication may be packed in various known messaging systems 10 such as the format for data described in SAE standard.

Figure 3C:
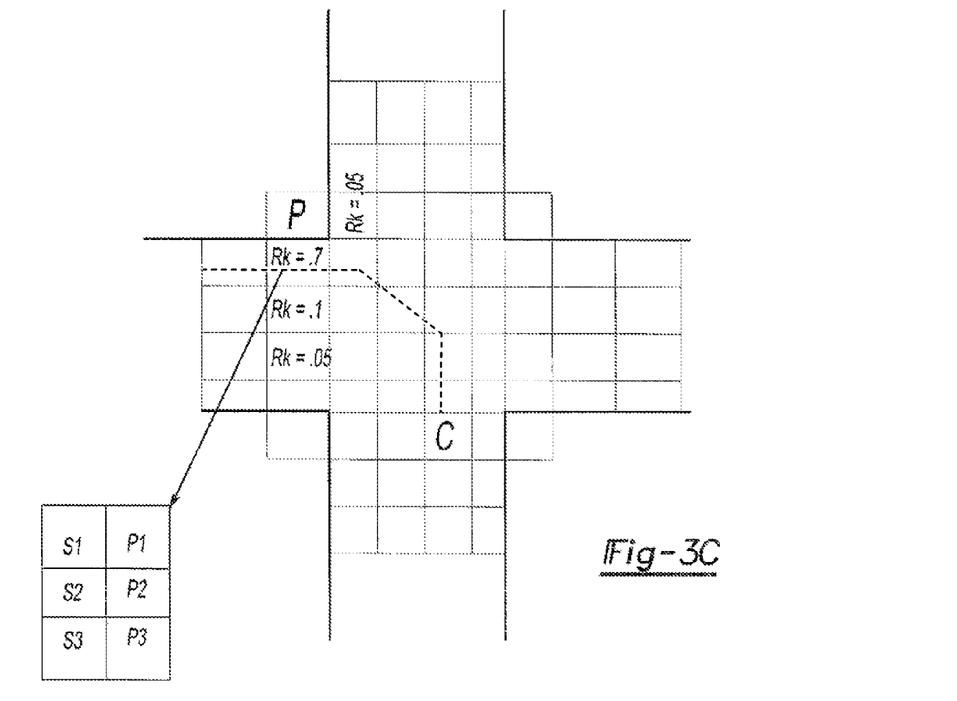
FIG. 3c is an illustration of the system showing how signal phase and timing of traffic signals such as a crosswalk may be used to help predict a collision.

With reference now to FIG. 3*c*, it is also anticipated that the conditions of each traffic signal may also be communicated to the system 10. For instance, the traffic signals may communicate to the system 10 that they are presenting a green light, red light, or a "walk" sign. This information may be used by the path collision circuit 29 to generate warnings.

For instance, if two predicted paths cross each other at an intersection as shown in FIGS. 1 and 2, the system 10 may take into consideration the condition of the traffic lights 38 and/or cross-walk lights 42. Thus, if one of the traffic lights 38 is red and the other is green, and a vehicle approaching the red light begins to slow, the path collision circuit 29 may not send a warning to either the system vehicle 18, or the roadside infrastructure 30. Thus neither the system vehicle 18 nor pedestrians within the predetermined range of the roadside infrastructure 30 will receive a warning. Alternatively, if a vehicle does not slow down in its approach to a red light, the system 10 may give a warning to both the system vehicle 18 notifying the system vehicle 18 and the roadside infrastructure 30 that another vehicle may run the red light. Upon receipt of this warning, the roadside infrastructure 30 may actuate the alert mechanism to notify nearby pedestrians of the potential collision.

With reference again to FIG. 3c, diagram of the risk probabilities of the traffic light 38 conditions is provided. An embodiment of the pedestrian detection system 37 is shown at the road intersection. The pedestrian detection system 37 coverage is indicated by the area enclosed by the box. Each box of the grid indicates a GPS location. The pedestrian "P" is shown at a corner of the intersection, and the vehicle "C" path is indicated by the dotted line. The risk of a collision between the vehicle and the pedestrian is assessed for various GPS locations taking into account the state of the traffic lights 38. As shown, the grid locations closest to the pedestrian and within the predicted path of the vehicle present a greater risk of collision, i.e. "0.7," "0.1." While grid locations outside of the path of the vehicle present a minimal risk of ".05."

The system 10 may further include a roadside alert mechanism 44. As shown in FIG. 2, the alert mechanism may be a warning light or a siren and may be mounted onto the pedestrian detection system 37. Alternatively, the alert mechanism may be selectively distributed throughout the roadside infrastructure 30, as shown in FIGS. 1 and 4. The alert mechanism is in communication with the vehicle system 10, and the mechanism can further alert pedestrians when a collision is predicted. The roadside alert mechanism 44 may be located at an intersection so as to notify pedestrians in a crosswalk that a vehicle is oncoming and that the path of the vehicle may potentially intersect with the path of the pedestrian as the pedestrian is walking across the street.

Figure 5:
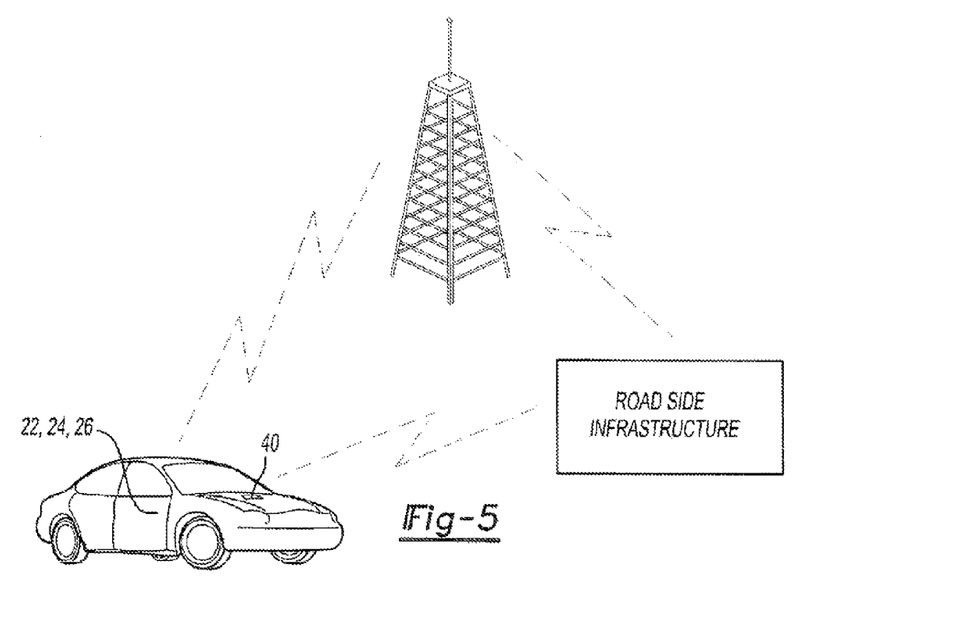
FIG. 5 is an illustration of FIG. 1 wherein the path predicting circuit and the collision predicting circuit are housed within the roadside infrastructure.

With reference now to FIGS. 1, 4 and 5 the operation of the system 10 is provided. The system vehicle 18 sensors 22, 24, 26 communicate to the path predicting circuit 28, providing the path predicting circuit 28 with information necessary to predict the path of the system vehicle 18. For instance, the system vehicle 18 may provide to the path predicting circuit 28 the velocity and location of the system vehicle 18. As shown in FIG. 4, a path predicting circuit 28 is integrated within the system vehicle 18, and another path predicting circuit 28 is incorporated as part of the roadside infrastructure 30. However, the path predicting circuit 28 may be housed in a remote server 46 as shown in FIG. 1.

As stated above, the roadside infrastructure 30 uses its sensors 22, 24, 26 to detect the presence of the system vehicle 18, and other objects within a predetermined range. FIGS. 1 and 4 shows the system vehicle 18 approaching a four-way intersection on a two-lane road. The four-way intersection is regulated by traffic lights 38, and cross-walk lights 42. Cameras 20 are selectively stationed throughout the intersection to detect pedestrians and other objects surrounding the crosswalk. The cameras 20 may be fused with radar 32 or sonar 34 so as to detect the movement and speed of pedestrians and other objects in the manner discussed above.

The roadside infrastructure 30 communicates with the path predicting circuit 28, and the path predicting circuit 28 predicts the path of each detected object as described above. The path predicting circuit 28 then transmits the predicted paths to the path collision circuit 29, wherein the path collision circuit 29 executes a warning algorithm 36 that processes all of the predicted paths to determine if the system vehicle 18 may collide with any of the detected objects. If the warning algorithm 36 determines that there may be a possibility of a collision, then a warning is transmitted to the system vehicle 18 notifying the system vehicle 18 that a potential collision exists. A driver interface 40, such as a display screen or a speaker, then notifies the driver of the potential collision. Additionally, the path collision circuit 29 may transmit a warning to the roadside alert mechanism 44, and the roadside alert mechanism 44 may send a warning of a potential collision.

It should be inherent from the teachings above that the system 10 is scalable and modular, meaning that the system 10 can integrate various sensors 22, 24, 26 and be configured to adapt to different roadways. For instance, the roadside infrastructure 30 may be equipped with three cameras 20 in one intersection and only one camera 20 in another intersection. Further, the roadside infrastructure 30 may be selectively implemented in areas having a history of accidents. The system 10 is also beneficial to all pedestrians. Unlike previous collision warning systems, pedestrians need not be equipped with a communication device in order to be warned of a possible collision.

Figure 6:
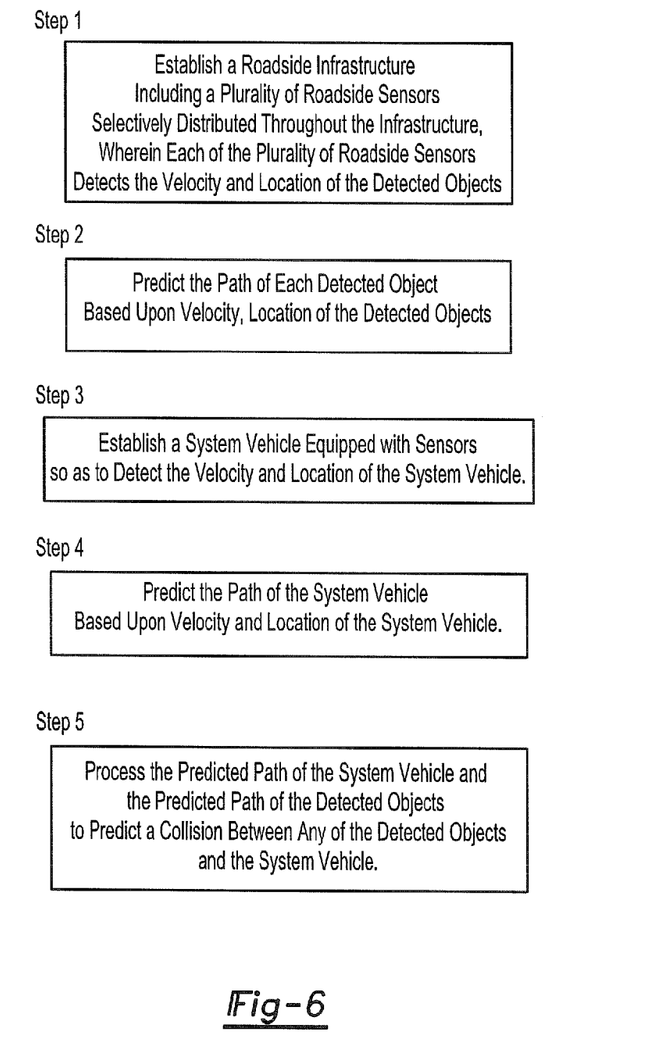
FIG. 6 shows the steps for a method of collision warning using path prediction.

A method 12 for predicting a collision comprises the step of establishing a roadside infrastructure 30 including a plurality of roadside sensors 22, 24, 26 selectively distributed throughout the infrastructure wherein each of the plurality of roadside sensors 22, 24, 26 detects objects and information from the objects useful for predicting the path of the objects. The method 12 also includes the step of establishing a system vehicle 18 equipped with sensors 22, 24, 26 that detect information needed to predict the path of the vehicle. The method 12 then proceeds to predicting the path of each detected object and predicting the path of each system vehicle 18, and then mapping the path of each detected object and the system vehicle 18. The mapped paths are then processed to determine if the paths intersect or a possible collision exists.

The method 12 then warns the system vehicle 18 and/or a pedestrian of the possible collision.

What is claimed is:
1. A system for predicting vehicle collision comprising:
a system vehicle including a velocity sensor, and a location sensor for detecting the velocity and location of the system vehicle;
at least one pedestrian detection system, the at least one pedestrian detection system having a base and a mast extending from the base, and a plurality of sensors mounted on the mast, the plurality of sensors detecting objects, to include pedestrians, and wherein the sensors include a GPS antenna, a thermal imaging camera and a high-resolution camera, an alert mechanism, a radio with an integrated directional antenna, and a short range communication antenna, wherein the at least one pedestrian detection system processes the images captured by the camera with GPS information from the GPS antenna to map the location of the objects;
a path predicting circuit in communication with the system vehicle and the pedestrian detection system, wherein the path predicting circuit predicts the path of the system vehicle based upon the velocity or location sensor and predicts the path of objects detected within the predetermined range of the pedestrian detection system;
a path collision circuit in communication with the path predicting circuit, wherein the predicted paths of the system vehicle and the object are mapped onto the path collision circuit so as to determine if the system vehicle and the object may collide, the short range communication antenna communicating with the system vehicle, wherein the short range communication antenna transmits a warning to the system vehicle when a collision is predicted, and wherein pedestrian detection system actuates the alert mechanism so as to warn pedestrians of a potential collision.

2. The system as set forth in claim 1, wherein the alert mechanism includes at least one of a programmable audio siren, or a pedestrian warning light.

3. The system as set forth in claim 1, further including a camera video analytic processor configured to synchronize and fuse high dynamic range color imagery detected by the high-resolution camera with thermal imagery detected by the thermal imaging camera.

4. The system as set forth in claim 3, wherein the camera video analytic processor includes embedded model-based tracking algorithms to ensure detected objects are not dropped.

5. A pedestrian detection system for detecting pedestrians within a predetermined area, the pedestrian detection system in communication with a system vehicle including a velocity sensor and a location sensor, the pedestrian detection system comprising:
- a base and a mast extending from the base, and a plurality of sensors mounted on the mast, the plurality of sensors detecting objects, to include pedestrians, and wherein the sensors include a GPS antenna, a thermal imaging camera and a high-resolution camera, an alert mechanism, a radio with an integrated directional antenna, and a short range communication antenna;
- a processor processing the images captured by the camera with GPS information from the GPS antenna to map the location of the objects;
- a path predicting circuit in communication with the system vehicle and the pedestrian detection system, wherein the path predicting circuit predicts the path of the system vehicle based upon the velocity or location sensor and predicts the path of objects detected within the predetermined range of the pedestrian detection system;
- a path collision circuit in communication with the path predicting circuit, wherein the predicted paths of the system vehicle and the object are mapped onto the path collision circuit so as to determine if the system vehicle and the object may collide; and
- the short range communication antenna communicating with the system vehicle and transmits a warning to the system vehicle when a collision is predicted, and wherein pedestrian detection system actuates the alert mechanism so as to warn pedestrians of a potential collision.

6. The pedestrian detection system as set forth in claim 5, wherein the alert mechanism includes at least one of a programmable audio siren, or a pedestrian warning light.

7. The pedestrian detection system as set forth in claim 5, wherein the mast is an elongated member extending generally upright from the base.

8. The pedestrian detection system as set forth in claim 5, further including a camera video analytic processor configured to synchronize and fuse high dynamic range color imagery detected by the high-resolution camera with thermal imagery detected by the thermal imaging camera.

9. The pedestrian detection system as set forth in claim 8, wherein the camera video analytic processor includes embedded model-based tracking algorithms to ensure detected objects are not dropped.

* * * * *